(12) United States Patent
Ono et al.

(10) Patent No.: US 9,724,988 B2
(45) Date of Patent: Aug. 8, 2017

(54) DRIVE SYSTEM FOR VEHICLE

(75) Inventors: Tomohito Ono, Susono (JP); Yuji Iwase, Mishima (JP); Yosuke Suzuki, Susono (JP); Kensei Hata, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 149 days.

(21) Appl. No.: 14/374,348

(22) PCT Filed: Jan. 30, 2012

(86) PCT No.: PCT/JP2012/052048
§ 371 (c)(1),
(2), (4) Date: Jul. 24, 2014

(87) PCT Pub. No.: WO2013/114550
PCT Pub. Date: Aug. 8, 2013

(65) Prior Publication Data
US 2015/0025729 A1    Jan. 22, 2015

(51) Int. Cl.
*B60K 1/02* (2006.01)
*B60L 15/20* (2006.01)
(Continued)

(52) U.S. Cl.
CPC .............. *B60K 1/02* (2013.01); *B60L 11/123* (2013.01); *B60L 15/2045* (2013.01);
(Continued)

(58) Field of Classification Search
CPC ...... B60K 1/02; B60L 15/2054; B60L 11/123; B60L 15/2045; B60L 2240/421;
(Continued)

(56) References Cited

U.S. PATENT DOCUMENTS 7,101,307 B2 * 9/2006 Clauson ................. B60K 6/365
180/65.235
2003/0029653 A1    2/2003 Fujikawa
(Continued)

FOREIGN PATENT DOCUMENTS

JP    2003-052102 A    2/2003
JP    2003-189690 A    7/2003
(Continued)

OTHER PUBLICATIONS

Machine Translation of JP 2009-255839, printed Jun. 28, 2016.*

*Primary Examiner* — Redhwan K Mawari
*Assistant Examiner* — Alan D Hutchinson
(74) *Attorney, Agent, or Firm* — Andrews Kurth Kenyon LLP

(57) ABSTRACT

A drive system for a vehicle includes a first motor, a second motor, and a differential mechanism that includes a first rotation element connected to the first motor, a second rotation element connected to the second motor, and a third rotation element connected to driving wheels, the first rotation element and the second rotation element are located on the opposite sides with the third rotation element interposed therebetween in a collinear diagram of the differential mechanism, and an area that is not able to be selected as a target control quantity is determined within a range of the control quantity that is able to be output by one motor of the first motor and the second motor.

4 Claims, 5 Drawing Sheets

(51) Int. Cl.
*F16H 3/72* (2006.01)
*B60W 10/08* (2006.01)
*B60L 11/12* (2006.01)

(52) U.S. Cl.
CPC ......... *B60L 15/2054* (2013.01); *B60W 10/08* (2013.01); *F16H 3/724* (2013.01); *B60L 2240/421* (2013.01); *B60L 2240/423* (2013.01); *B60L 2240/486* (2013.01); *Y02T 10/6217* (2013.01); *Y02T 10/645* (2013.01); *Y02T 10/648* (2013.01); *Y02T 10/7077* (2013.01); *Y02T 10/7283* (2013.01)

(58) Field of Classification Search
CPC ........ B60L 2240/423; B60L 2240/486; B60W 10/08; F16H 3/724; Y02T 10/7283; Y02T 10/7077; Y02T 10/6217; Y02T 10/648
See application file for complete search history.

(56) References Cited

U.S. PATENT DOCUMENTS

2005/0241868 A1* 11/2005 Hommi ................. B60K 6/445
180/197
2008/0125928 A1 5/2008 Conlon et al.

FOREIGN PATENT DOCUMENTS

| JP | 2010-149840 A | 7/2010 |
|---|---|---|
| JP | 2011-073533 A | 4/2011 |

* cited by examiner

DRIVE SYSTEM FOR VEHICLE

CROSS-REFERENCE TO RELATED APPLICATIONS

This is a national phase application based on the PCT International Patent Application No. PCT/JP2012/052048 filed Jan. 30, 2012, the entire contents of which are incorporated herein by reference.

TECHNICAL FIELD

The present invention relates to a drive system for a vehicle.

BACKGROUND ART

Conventionally, a vehicle including plural motors is known. For example, Patent Document 1 discloses a technique of maximizing an operation range of a hybrid car that includes two electrical machines and that operates in an electric automobile operating state. Patent Document 1 discloses a technique of causing the car to run by causing the two electrical machines to generate a traction torque.

CITATION LIST

Patent Document

Patent Document 1: US 2008/0125928 A

SUMMARY OF THE INVENTION

Problem to be Solved by the Invention

At the time of operating with two motors connected to a differential mechanism as a power source, a control method when a degree of freedom in operation of each motor is higher has not been sufficiently studied conventionally. For example, it is preferable that efficiency be improved when an output sharing ratio of two motors or a degree of freedom in selection of an operating point thereof is high.

An object of the present invention is to provide a, drive system for a vehicle that can improve efficiency at the time of running with two motors connected to a differential mechanism as a power source.

Solution to Problem

According to the present invention, there is provided a drive system for a vehicle including: a first motor; a second motor; and a differential mechanism that includes a first rotation element connected to the first motor, a second rotation element connected to the second motor, and a third rotation element connected to driving wheels, wherein the first rotation element and the second rotation element are located on the opposite sides with the third rotation element interposed therebetween in a collinear diagram of the differential mechanism, and wherein an area that is not able to be selected as a target control quantity is determined within a range of the control quantity that is able to be output by one motor of the first motor and the second motor.

In the drive system for a vehicle, it is preferable that the area that is not able to be selected as the target control quantity be determined as two or more areas and the determined areas are discrete.

In the drive system for a vehicle, it is preferable that the control quantity that is able to be selected as the target control quantity of the one motor be determined as two or more points discrete in the range of the control quantity that is able to be output by the one motor.

In the drive system for a vehicle, it is preferable that the target control quantity of the other motor be determined to realize a request output of the vehicle.

In the drive system for a vehicle, it is preferable that a change in the control quantity of one motor of the first motor and the second motor be inhibited while the control quantity of the other motor is changed.

In the drive system for a vehicle, it is preferable that the control quantity of the one motor be changed to the target control quantity earlier than the control quantity of the other motor on the basis of the request output of the vehicle.

In the drive system for a vehicle, it is preferable that the control quantity of the motor having the smaller inertia out of the first motor and the second motor be preferentially changed when an acceleration request is given to the vehicle.

In the drive system for a vehicle, it is preferable that the first motor and the second motor be rotary electrical machines and that the control quantity of the motor having the larger inertia out of the first motor and the second motor be preferentially changed when a deceleration request is given to the vehicle.

In the drive system for a vehicle, it is preferable that the first motor and the second motor be rotary electrical machines and that when a deceleration request is given to the vehicle, the control quantity of the motor having the larger inertia out of the first motor and the second motor be preferentially changed at a high vehicle speed and the control quantity of the motor having the smaller inertia out of the first motor and the second motor be preferentially changed at a low vehicle speed.

In the drive system for a vehicle, the control quantity of the area that is not able to be selected as the target control quantity out of two or more control quantities of the one motor be at least one of a torque or a rotation speed.

Advantageous Effects

The drive system for a vehicle according to the present invention includes the first motor, the second motor, and the differential mechanism that includes the first rotation element connected to the first motor, the second rotation element connected to the second motor, and the third rotation element connected to driving wheels. In a collinear diagram of the differential mechanism, the first rotation element and the second rotation element are located on the opposite sides with the third rotation element interposed therebetween. The area that is not able to be selected as a target control quantity is determined within a range of the control quantity that is able to be output by one motor of the first motor and the second motor. The drive system for a vehicle according to the present invention can improve efficiency at the time of running with two motors connected to a differential mechanism as a power source.

MODES FOR CARRYING OUT THE INVENTION

Hereinafter, a drive system for a vehicle according to an embodiment of the present invention will be described with reference to the accompanying drawings. The present invention is not limited to this embodiment. Elements of the below-described embodiment include elements that can be easily supposed by those skilled in the art or elements that are substantially equivalent to each other.

[Embodiment]

Figure 1:
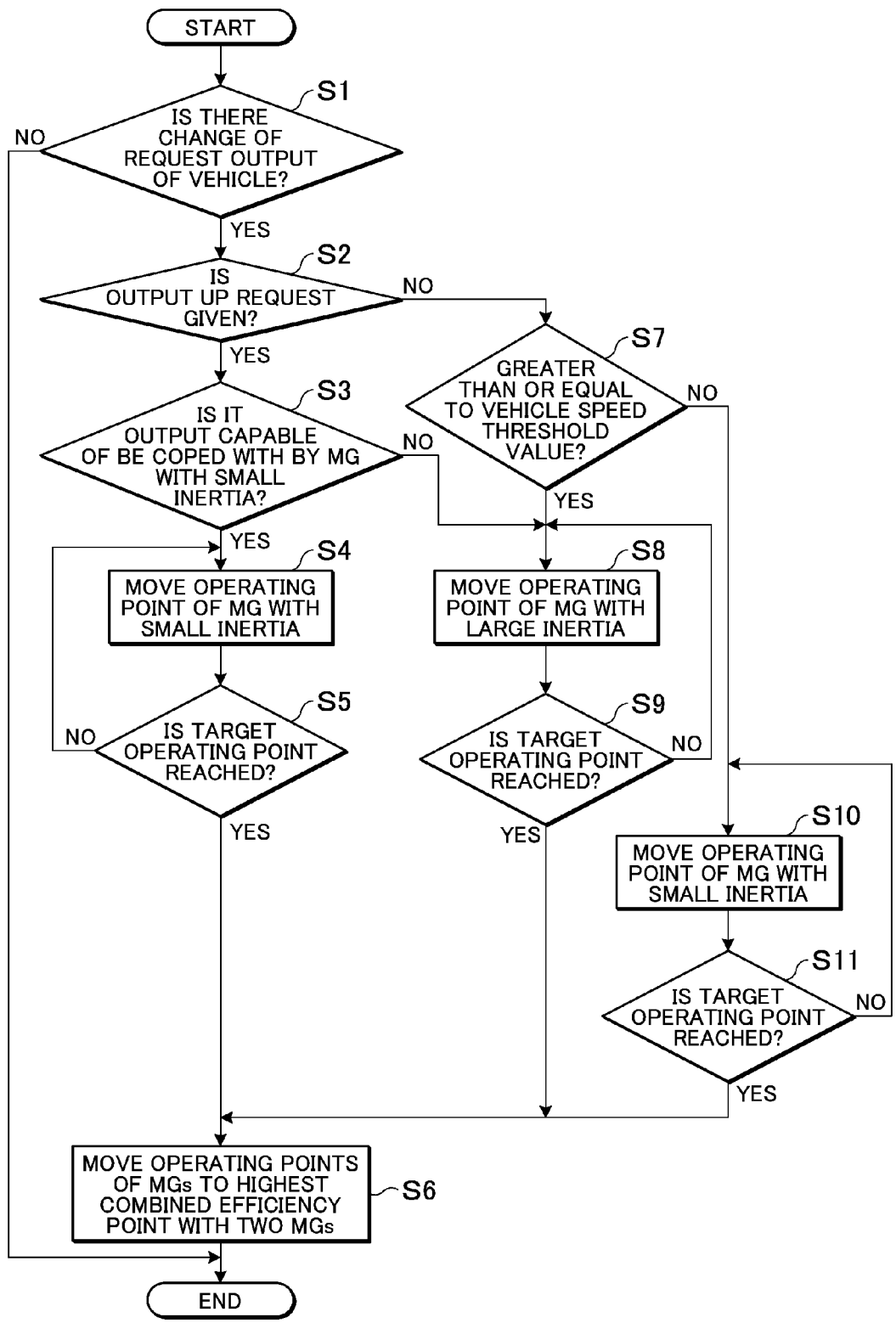
FIG. 1 is a flowchart illustrating an operation of a drive system for a vehicle according to an embodiment of the present invention.

The embodiment will be described below with reference to FIGS. 1 to 7. This embodiment relates to a drive system for a vehicle. FIG. 1 is a flowchart illustrating an operation of a drive system for a vehicle 1-1 according to the embodiment of the present invention and FIG. 2 is a diagram schematically illustrating a configuration of a vehicle 100 according to the embodiment.

Figure 2:
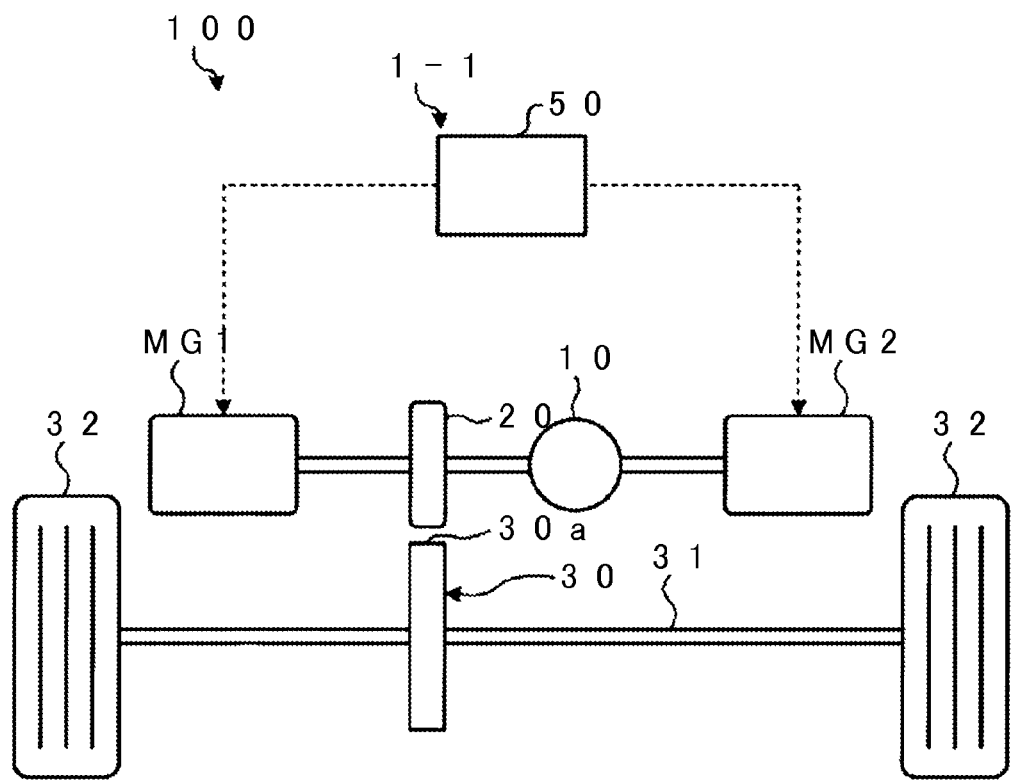
FIG. 2 is a diagram schematically illustrating a configuration of a vehicle according to the embodiment.

The vehicle 100 illustrated in FIG. 2 includes a first rotary electrical machine MG1, a second rotary electrical machine MG2, a planetary gear mechanism 10, an output gear 20, a differential arrangement 30, a drive shaft 31, driving wheels 32, and an ECU 50. The vehicle 100 is, for example, an electric vehicle (EV) that can run with the first rotary electrical machine MG1 and the second rotary electrical machine MG2 as a power source. The vehicle 100 may be a hybrid car that further includes an engine as a power source.

The drive system for a vehicle 1-1 according to this embodiment includes a first rotary electrical machine MG1, a second rotary electrical machine MG2, and a planetary gear mechanism 10. The drive system for a vehicle 1-1 may include an ECU 50.

Each of the first rotary electrical machine MG1 and the second rotary electrical machine MG2 has a function of a motor (electric motor) and a function of a power generator. The first rotary electrical machine MG1 and the second rotary electrical machine MG2 are connected to a battery via an inverter. The first rotary electrical machine MG1 and the second rotary electrical machine MG2 can convert electric power supplied from the battery into mechanical power and can output the mechanical power, and can be driven with input power to convert the mechanical power into electric power. The electric power generated by the rotary electrical machines MG1, MG2 can be accumulated in the battery. For example, AC synchronization type motor-generator can be used as the first rotary electrical machine MG1 and the second rotary electrical machine MG2.

In this embodiment, the first rotary electrical machine MG1 corresponds to the first motor, and the second rotary electrical machine MG2 corresponds to the second motor. The present invention is not limited to this configuration, but another known motor, for example, an engine, may be disposed instead of the first rotary electrical machine MG 1. Another known motor, for example, an engine, may be disposed instead of the second rotary electrical machine MG2. The first motor and the second motor may be an arbitrary motor that can convert energy into a rotational motion and output the rotational motion. It is preferable that the engine include a starting device such as a starter or be able to autonomously start up.

Figure 3:
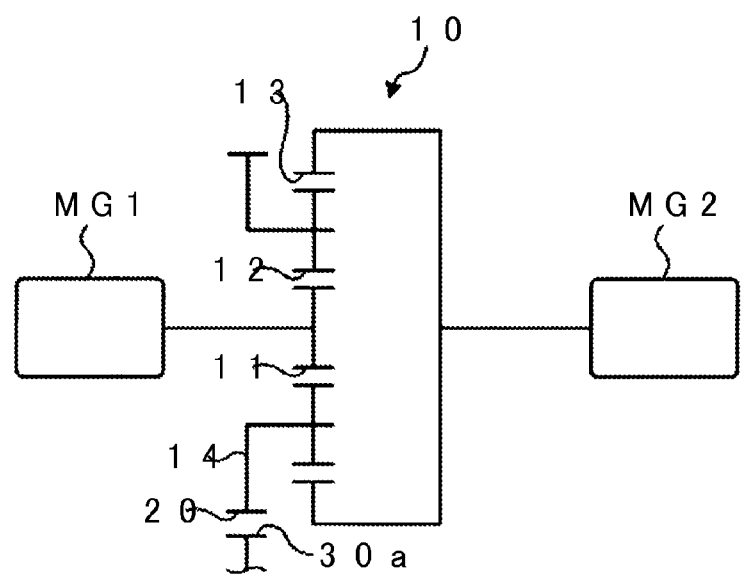
FIG. 3 is a diagram illustrating an example of a configuration of a planetary gear mechanism and connection to each rotary electrical machine

The planetary gear mechanism 10 corresponds to the differential mechanism. FIG. 3 is a diagram illustrating an example of a configuration of the planetary gear mechanism 10 and connection to the rotary electrical machines MG1, MG2. The planetary gear mechanism 10 is of a single pinion type and includes a sun gear 11, a pinion gear 12, a ring gear 13, and a carrier 14. The ring gear 13 is coaxial with the sun gear 11 and is disposed on the outside in the radial direction of the sun gear 11. The pinion gear 12 is disposed between the sun gear 11 and the ring gear 13 and engages with the sun gear 11 and the ring gear 13. The pinion gear 12 is rotatably supported by the carrier 14. The carrier 14 is rotatably supported coaxially with the sun gear 11.

In this embodiment, the planetary gear mechanism 10 includes three rotation elements of the sun gear 11, the carrier 14, and the ring gear 13. The sun gear 11 is connected to the first rotary electrical machine MG1 and rotates as a unified body with the rotor of the first rotary electrical machine MG 1. The ring gear 13 is connected to the second rotary electrical machine MG2 and rotates as a unified body with the rotor of the second rotary electrical machine MG2. The carrier 14 is connected to the output gear 20 and rotates as a unified body with the output gear 20. In this embodiment, the sun gear 11 corresponds to the first rotation element, the ring gear 13 corresponds to the second rotation element, and the carrier 14 corresponds to the third rotation element.

Referring to FIG. 2 again, the output gear 20 engages with a differential ring gear 30a of the differential arrangement 30. The differential arrangement 30 is connected to the driving wheels 32 via the right and left drive shaft 31. That is, the carrier 14 is connected to the driving wheels 32 via the output gear 20, the differential arrangement 30, and the drive shaft 31.

The ECU 50 is mounted on the vehicle 100. The ECU 50 is an electronic control unit including a computer. The ECU 50 has a function of a controller that controls the constituent units of the vehicle 100. The ECU 50 is connected to the first rotary electrical machine MG1 and the second rotary electrical machine MG2 and can control the first rotary electrical machine MG1 and the second rotary electrical machine MG2. When an engine is mounted on the vehicle 100, the ECU 50 may control the engine.

Figure 4:
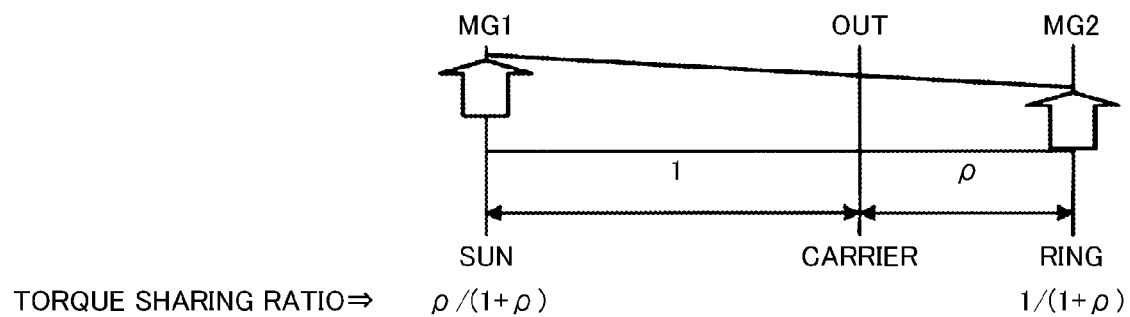
FIG. 4 is a collinear diagram of the planetary gear mechanism.

FIG. 4 is a collinear diagram of the planetary gear mechanism 10. In the collinear diagram, the left axis represents the rotation speed of the sun gear 11 and the first rotary electrical machine MG1, the central axis represents the rotation speed of the carrier 14 and the output gear 20, the right axis represents the rotation speed of the ring gear 13 and the second rotary electrical machine MG2. As illustrated in FIG. 4, in the collinear diagram, the carrier 14, that is, the third rotation element, is located between the sun gear 11 and the ring gear 13. In other words, in the collinear diagram, the first rotary electrical machine MG1 and the sun gear 11 are located on the opposite sides and the second rotary electrical machine MG2 and the ring gear 13 are located on the opposite sides, with the carrier 14 as the output shaft interposed therebetween.

With such a configuration on the collinear diagram, the drive system for a vehicle 1-1 constitutes a rotation speed selection type in which the rotation speed of the first rotary electrical machine MG1 and the rotation speed of the second rotary electrical machine MG2 can be changed at the same vehicle speed. The rotation speed of the first rotary electrical machine MG1 (hereinafter, also simply referred to as "MG1 rotation speed") and the rotation speed of the second rotary electrical machine MG2 (hereinafter, also simply referred to as "MG2 rotation speed") can be selected in correlation with each other with respect to the rotation speed of the carrier 14 requested to the vehicle.

On the other hand, the ratio of the torque of the first rotary electrical machine MG1 (hereinafter, also simply referred to as "MG1 torque") and the torque of the second rotary electrical machine MG2 (hereinafter, also simply referred to as "MG2 torque") is uniquely determined. The torque ratio of the MG1 torque and the MG2 torque is determined depending on the gear ratio of the planetary gear mechanism 10. Specifically, when the gear ratio of the sun gear 11 and the carrier 14 is set to 1 and the gear ratio of the carrier 14 and the ring gear 13 is set to p, the torque sharing ratio of the sun gear 11 is expressed by Expression (1) and the torque sharing ratio of the ring gear 13 is expressed by Expression (2).

$$\rho/(1+\rho) \qquad (1)$$

$$1/(1+\rho) \qquad (2)$$

That is, the MG1 torque to be output from the first rotary electrical machine MG1 and the MG2 torque to be output from the second rotary electrical machine MG2 are respectively determined by the sharing ratio on the basis of request values such as the request torque of the vehicle 100. For example, when the request value of the torque to be output from the carrier 14 is Tout, the MG1 torque Tmg1 is determined by Expression (3) and the MG2 torque Tmg2 is determined by Expression (4).

$$Tmg1 = Tout \times \rho/(1+\rho) \qquad (3)$$

$$Tmg2 = Tout \times 1/(1+\rho) \qquad (4)$$

Here, how to control the operations of two rotary electrical machines MG1, MG2 in a gear train in which the MG1 rotation speed and the MG2 rotation speed can be selected has not been sufficiently studied. For example, when the MG1 rotation speed and the MG2 rotation speed are simultaneously changed, the control may be complicated. It is preferable that the rotary electrical machines MG1, MG2 be controlled to reduce loss.

The drive system for a vehicle 1-1 according to this embodiment causes one of the two rotary electrical machines MG1, MG2 to operate at an operating point selected from several predetermined candidate points and sets the specific vehicle speed and the specific drive force by the use of the other rotary electrical machine. That is, one rotary electrical machine is caused to step-likely operate and the other rotary electrical machine is caused to linearly operate.

Figure 5:
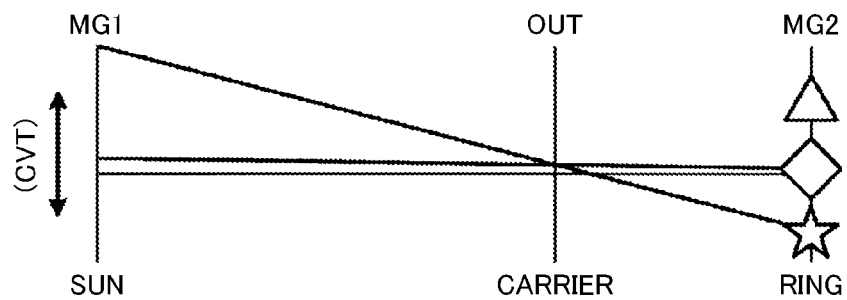
FIG. 5 is a diagram illustrating an operation image of each rotation element in the drive system for a vehicle according to the embodiment.

FIG. 5 is a diagram illustrating an operation image of each rotation element in the drive system for a vehicle 1-1 according to this embodiment. In this embodiment, the second rotary electrical machine MG2 is the rotary electrical machine to step-likely operate and the first rotary electrical machine MG1 is the rotary electrical machine for realizing the specific vehicle speed and the specific drive force. In this embodiment, the inertia of the second rotary electrical machine MG2 is larger than the inertia of the first rotary electrical machine MG1. That is, in this embodiment, the second rotary electrical machine MG2 having the relatively large inertia is the rotary electrical machine to step-likely operate and the first rotary electrical machine MG1 having the relatively small inertia is the rotary electrical machine to linearly operate. The target control quantities of the first rotary electrical machine MG1, that is, the target values of the rotation speed and the torque of the first rotary electrical machine MG1, are determined to be values capable of realizing the request output of the vehicle 100. The target control quantities of the first rotary electrical machine MG1 are allowed to be arbitrarily determined within a range of the control quantity that can be output from the first rotary electrical machine MG1.

As illustrated in FIG. 5, plural candidate points (triangular mark, quadrangular mark, and star mark) are determined in advance as the selectable points of the control quantity in the rotation speed of the second rotary electrical machine MG2. These candidate points are determined within the range of the rotation speed that can be output from the second rotary electrical machine MG2, and is discontinuous and discrete.

For example, the gap between the neighboring candidate points is larger than the minimum step width when the rotation speed of the second rotary electrical machine MG2 is changed consecutively. The target rotation speed of the second rotary electrical machine MG2 is selected from the rotation speeds of the candidate points. The rotation speeds between the areas other than the candidate point, for example, between the candidate points, cannot be selected as the target rotation speed of the second rotary electrical machine MG2. That is, areas that cannot be selected as the target rotation speed are determined within the range of the rotation speed that can be output from the second rotary electrical machine MG2. The areas that cannot be selected as the target rotation speed are discretely determined with the candidate points interposed therebetween and plural non-selectable areas are determined.

The same is true of the torque of the second rotary electrical machine MG2. In this embodiment, the target operating point of the second rotary electrical machine MG2 is selected from candidate operating points X1, X2, and X3 (see FIG. 6) to be described later. Accordingly, areas that cannot be selected as the target torque are determined within the range of the torque that can be output from the second rotary electrical machine MG2.

The areas that cannot be selected as the target control quantity may not be determined for any of the rotation speed and the torque of the second rotary electrical machine MG2. As for the control quantity of the first rotary electrical machine MG1 instead of the second rotary electrical machine MG2, the areas that cannot be selected as the target control quantity may be determined in the range of the control quantity that can be output.

Since the target rotation speed of the second rotary electrical machine MG2 is selected from the candidate points that are discretely arranged, the second rotary electrical machine MG2 can serve as a stepped variable transmission that changes the output rotation speed in a stepped manner.

On the other hand, the target rotation speed of the first rotary electrical machine MG1 may be set to an arbitrary rotation speed. That is, the first rotary electrical machine MG1 can serve as a continuously-variable transmission (CVT) that continuously changes the output rotation speed. In this embodiment, the minimum variation of the target rotation speed at the time of changing the target rotation speed of the first rotary electrical machine MG1 is smaller than the minimum variation of the target rotation speed at the time of changing the target rotation speed of the second rotary electrical machine MG2.

The drive system for a vehicle 1-1 causes the operating point of the second rotary electrical machine MG2 to earlier move to the target operating point than the operating point of the first rotary electrical machine MG1 at the time of changing the operating point on the basis of the request output of the vehicle 100. That is, the control quantity of the second rotary electrical machine MG2 is earlier changed to the target control quantity than the control quantity of the first rotary electrical machine MG1.

Figure 6:
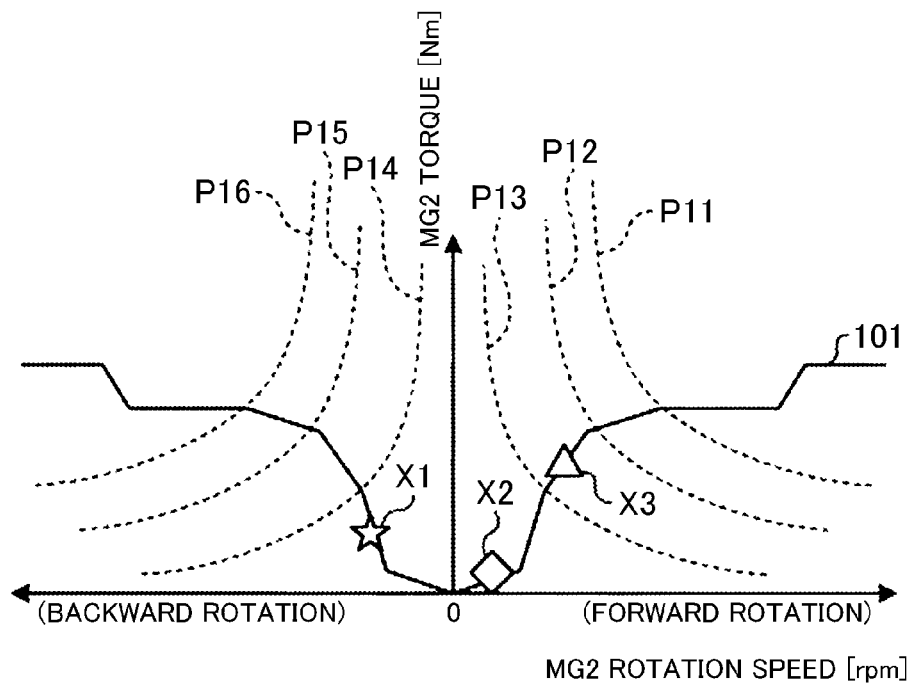
FIG. 6 is a diagram illustrating a method of selecting an operating point of a second rotary electrical machine.
Figure 7:
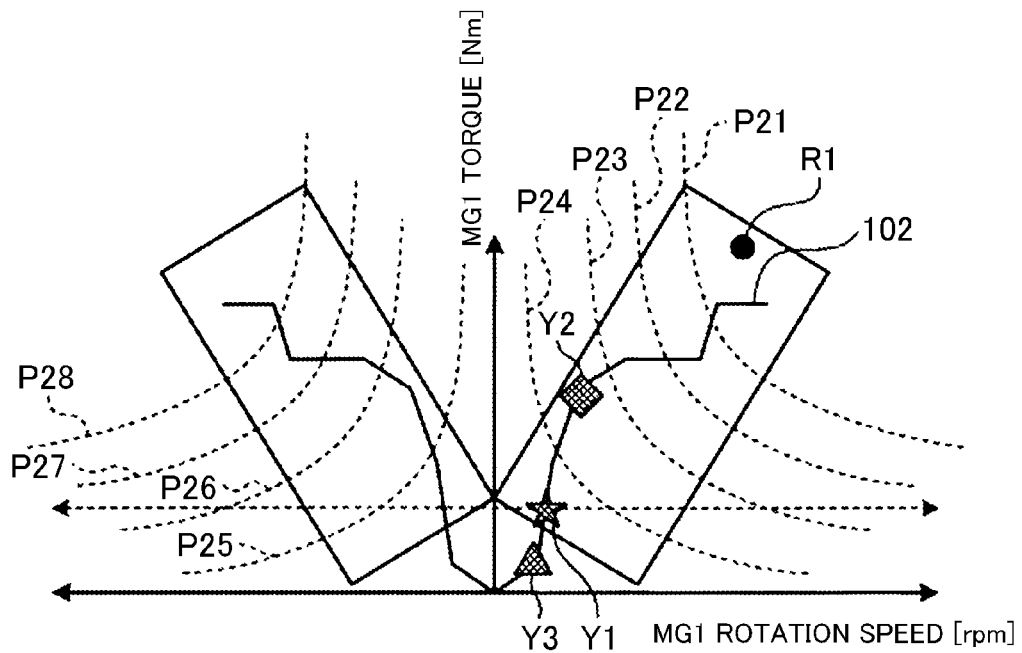
FIG. 7 is a diagram illustrating a method of selecting an operating point of a first rotary electrical machine

FIG. 6 is a diagram illustrating a method of selecting the operating point of the second rotary electrical machine MG2 and FIG. 7 is a diagram illustrating a method of selecting the operating point of the first rotary electrical machine MG1. In FIGS. 6, 7, the horizontal axis represents the rotation speed and the vertical axis represents the torque. The forward rotation direction is the rotation direction of the carrier 14 and the output gear 20 when the vehicle 100 moves forward.

In FIG. 6, dotted lines P11, P12, P13, P14, P15, and P16 represent equivalent power lines. In FIG. 7, dotted lines P21, P22, P23, P24, P25, P26, P27, and P28 represent equivalent power lines. The equivalent power lines connect the operating points having the same power. A solid line 101 in FIG. 6 and a solid line 102 in FIG. 7 represent optimal operating lines. The optimal operating line (hereinafter, simply referred to as "MG2 optimal operating line") 101 of the second rotary electrical machine MG2 connects the operating points at which the second rotary electrical machine MG2 can operate with high efficiency. The MG2 optimal operating line 101 connects, for example, the operating points at which the efficiency of the second rotary electrical machine MG2 is the highest in the equivalent power lines P11, P12, P13, P14, P15, and P16.

The points X1, X2, and X3 in the MG2 optimal operating line 101 are predetermined candidate operating points. The target operating point of the second rotary electrical machine MG2 is selected from the candidate operating points X1, X2, and X3. In other words, an operating point other than the candidate operating points X1, X2, and X3 is inhibited from being set as the target operating point. The second rotary electrical machine may be allowed to operate at the operating point other than the candidate operating points X1, X2, and X3 in a transient state or the like.

The optimal operating line (hereinafter, simply referred to as "MG1 optimal operating line") 102 of the first rotary electrical machine MG1 connects the operating points at which the first rotary electrical machine MG1 can operated with high efficiency. The MG1 optimal operating line 102 connects, for example, the operating points at which the efficiency of the first rotary electrical machine MG1 is the highest in the equivalent power lines P21, P22, P23, P24, P25, P26, P27, and P28.

The ECU 50 determines the target operating point of the second rotary electrical machine MG2, for example, as will be described below. The ECU 50 calculates the request power of the vehicle 100, for example, on the basis of a degree of accelerator opening and the vehicle speed. The request torque value Tout output from the carrier 14 can be calculated on the basis of the request power, the vehicle wheel speed, and the reduction gear ratio from the carrier 14 to the driving wheels 32. The ECU 50 determines the MG2 torque Tmg2 on the basis of Expression (4) using the request torque value Tout.

The ECU 50 selects the target operating point from the candidate operating points X1, X2, and X3 on the basis of the determined MG2 torque Tmg2. The ECU 50 can select a candidate operating point at which the torque difference from the determined MG2 torque Tmg2 is the minimum and the rotation speed difference from the current MG2 rotation speed is small as the target operating point. Alternatively, the ECU 50 can select the candidate operating point at which the rotation speed difference from the current MG2 rotation speed is the minimum out of the candidate operating points X1, X2, and X3 as the target operating point. Alternatively, the ECU 50 can select the candidate operating point at which the power difference from the equivalent power line corresponding to the determined MG2 torque Tmg2 and a predetermined rotation speed is the minimum as the target operating point. The predetermined rotation speed may be set, for example, to the current MG2 rotation speed, the rotation speed of the carrier 14, a predetermined MG2 rotation speed with respect to the rotation speed of the carrier 14, or the like.

Among the candidate operating points X1, X2, and X3, the ECU 50 can select the candidate operating point at which the torque difference from the determined MG2 torque Tmg2 is small and the rotation speed difference from the current MG2 rotation speed is the minimum as the target operating point.

When the candidate operating point at which the rotation speed difference from the current MG2 rotation speed is small is selected as the target operating point, the inertia loss at the time of moving the operating point of the second rotary electrical machine MG2 can be reduced. By selecting the candidate operating point at which the rotation speed difference from the current MG2 rotation speed is small as the target operating point, the current operating point is often selected again as the target operating point even when the request to the vehicle 100 is slightly changed. As a result, the degree of change of the operating point of the second rotary electrical machine MG2 is reduced and thus the inertial loss is reduced.

The ECU 50 controls the second rotary electrical machine MG2 on the basis of the determined target operating point of the second rotary electrical machine MG2. When the operating point of the second rotary electrical machine MG2 moves to the target operating point, the ECU 50 causes the second rotary electrical machine MG2 to operate at the target operating point.

On the other hand, the ECU 50 determines the operating point of the first rotary electrical machine MG1 on the basis of the target operating point or the actual operating point of the second rotary electrical machine MG2 and the request to the vehicle 100. For example, the ECU 50 calculates the target MG1 torque Tmg1 of the first rotary electrical machine MG1 using Expression (3) on the basis of the request torque value Tout. The MG1 rotation speed is determined on the basis of the vehicle speed and the MG2 rotation speed. The ECU 50 sets a temporary target operating point to the operating point determined on the basis of the determined MG1 rotation speed and the target MG1 torque Tmg1 of the first rotary electrical machine MG1.

For example, the ECU 50 can set the temporary target operating point as the target operating point of the first rotary electrical machine MG1 without any change. Alternatively, a point around the temporary target operating point in the MG1 optimal operating line 102 may be set as the target operating point of the first rotary electrical machine MG1.

The ECU 50 may set the operating point in the MG1 optimal operating line 102 at which the request torque value Tout can be realized as the target operating point of the first rotary electrical machine MG1. On the other hand, the target operating point of the first rotary electrical machine MG1 may be determined using another method so as to realize the request output of the vehicle.

FIG. 7 illustrates an example of the target operating points Y1, Y2, and Y3 of the first rotary electrical machine MG1 corresponding to the candidate operating points X1, X2, and X3 illustrated in FIG. 6. For example, when the candidate operating point X1 is set as the target operating point of the second rotary electrical machine MG2, the target operating point of the first rotary electrical machine MG1 is the operating point indicated by Y1.

As illustrated in FIG. 7, a recommended operating area R1 of the first rotary electrical machine MG1 is set. The recommended operating area R1 is determined to be an area around the MG1 optimal operating line 102. In FIG. 7, the recommended operating area R1 is a rectangular area, but is not limited to this shape. The recommended operating area R1 may be determined, for example, to be a set of operating points at which the efficiency of the first rotary electrical machine MG1 is greater than or equal to a predetermined value.

For example, when the determined target operating point of the first rotary electrical machine MG1 is not an operating point in the recommended operating area R1, the ECU 50 may select the target operating point of the second rotary electrical machine MG2 again. For example, when the determined target operating point of the first rotary electrical machine MG1 departs to the lower rotation speed side from the recommended operating area R1, the target operating point of the second rotary electrical machine MG2 is selected again so as to set the target rotation speed of the first rotary electrical machine MG1 to a higher rotation speed. For example, out of the candidate operating points X1, X2, and X3, the candidate operating point that is located on a lower rotation speed side than the target operating point of the second rotary electrical machine MG2 up to now is selected as a new target operating point.

By this feedback control, it is possible to enhance the comprehensive efficiency of two rotary electrical machines MG1, MG2.

The control of this embodiment will be described below with reference to FIG. 1. The control flow illustrated in FIG. 1 is performed when the vehicle 100 stops or runs, and is repeatedly performed, for example, for every predetermined time interval.

First, in step S1, the ECU 50 determines whether or not the request output of the vehicle is changed. In step S1, it is determined whether the request output of the vehicle is given to change the operating points of the rotary electrical machines MG1, MG2. The ECU 50 performs the determination of step S1, for example, on the basis of changes in the request power, the request drive force, and the request torque of the vehicle 100. For example, when the change of the request output of the vehicle 100 is greater than or equal to a predetermined value, the determination result of step S1 may be set to be positive. The process of step S2 is performed when it is determined in step S1 that the request output of the vehicle is changed (Y in step S1), and the control flow ends otherwise (N in step S1).

In step S2, the ECU 50 determines whether the change of the request output of the vehicle in step S1 is an output UP request. In step S2, it is determined whether an acceleration request is given. When the change of the request output of the vehicle is a change for accelerating the vehicle 100, the ECU 50 performs the determination of step S2 to be positive. The process of step S3 is performed when it is determined in step S2 that the output UP request is given (Y in step S2), and the process of step S7 is performed otherwise (N in step S2).

In step S3, the ECU 50 determines whether the output can be coped with by the rotary electrical machine with small inertia. The ECU 50 determines whether the request output of the vehicle can be realized by the control of the rotary electrical machine with small inertia, that is, the first rotary electrical machine MG1 in this embodiment. More specifically, the ECU 50 determines whether the request output of the vehicle, for example, the request power, can be realized by changing the operating point of the first rotary electrical machine MG1 while maintaining the operating point of the second rotary electrical machine MG2 at the current operating point.

The ECU 50 determines whether the operating point of the first rotary electrical machine MG1, for example, at which the request output of the vehicle can be realized is present in an allowable operating area. The allowable operating area may be, for example, an area of the operating point within a range of the maximum torque or the maximum rotation speed that can be output, or an area of the operating point within a range of the maximum torque or the maximum rotation speed determined in advance in terms of efficiency or the like. At the time of the determination of step S3 based on the allowable operating area, the determination result is positive when the operating point of the first rotary electrical machine MG1 at which the request output of the vehicle can be realized is in the allowable operating area, and the determination result is negative when the operating point departs from the allowable operating area.

The process of step S4 is performed when it is determined in step S3 that the output is an output that can be coped with by the rotary electrical machine with small inertia (Y in step S3), and the process of step S8 is performed otherwise (N in step S3).

In step S4, the operating point of the rotary electrical machine with small inertia, that is, the first rotary electrical machine MG1, is made to move by the ECU 50. The ECU 50 causes the operating point of the first rotary electrical machine MG1 to move to the target operating point so as to realize the request output of the vehicle. After the process of step S4 is performed, the process of step S5 is performed.

In step S5, the ECU 50 determines whether the operating point reaches the target operating point. The ECU 50 determines whether the operating point of the first rotary electrical machine MG1 reaches the target operating point at which the request output of the vehicle can be realized. The process of step S6 is performed when it is determined that the operating point reaches the target operating point (Y in step S5), and the process of step S4 is performed otherwise (N in step S5).

In step S7, the ECU 50 determines whether the vehicle speed is higher than or equal to a threshold value. In this embodiment, when a deceleration request is given (N in step S2), which operating point of the first rotary electrical machine MG1 and the second rotary electrical machine MG2 to preferentially move is determined on the basis of the vehicle speed. In response to a regeneration (deceleration) request, the ECU 50 preferentially performs regenerative power generation using the rotary electrical machine with large inertia, that is, the second rotary electrical machine MG2 in this embodiment, in a high vehicle speed range. Accordingly, it is possible to lower the rotation speed of the second rotary electrical machine MG2. By lowering the MG2 rotation speed, it is possible to suppress loss due to the continuous operation of the second rotary electrical machine MG2 at a high rotation speed.

On the other hand, in response to the regeneration request, the ECU 50 preferentially performs the regenerative power generation using the rotary electrical machine with small inertia, that is, the first rotary electrical machine MG1 in this embodiment, in a low vehicle speed range. Accordingly, it is possible to lower the rotation speed of the first rotary electrical machine MG1. By lowering the MG1 rotation speed, acceleration can be realized by the first rotary electrical machine MG1 with small inertia at a high response speed when a re-acceleration request is given. By preferentially performing the regenerative power generation using the first rotary electrical machine MG1 to suppress the variation in the rotation speed of the second rotary electrical machine MG2, it is possible to reduce the total loss by the rotation maintaining power. The drive system for a vehicle 1-1 according to this embodiment can make the improvement in an amount of regenerative power and the improvement in responsiveness at the time of re-acceleration to be compatible with each other.

The process of step S8 is performed when it is determined in step S7 that the vehicle speed is higher than or equal to the threshold value (Y in step S7), and the process of step S10 is performed otherwise (N in step S7).

In step S8, the operating point of the rotary electrical machine with large inertia, that is, the second rotary electrical machine MG2, is made to move by the ECU 50. The ECU 50 determines the target operating point of the second rotary electrical machine MG2 on the basis of the request output of the vehicle. For example, when the determination result of step S3 is negative and the process of step S8 is performed, the operating point of the second rotary electrical machine MG2 can be determined by the method described above with reference to FIG. 6.

On the other hand, when the process flow goes from step S7 to step S8, the request output of the vehicle is a deceleration request and a negative torque is requested to the second rotary electrical machine MG2. The MG2 optimal operating line 101 and the candidate operating points X1, X2, and X3 when the MG2 torque is a positive torque are illustrated in FIG. 6, but the optimal operating line and the candidate operating points are similarly determined when the MG2 torque is a negative torque. Accordingly, the ECU 50 can determine the target operating point of the second rotary electrical machine MG2 at the time of regeneration on the basis of the optimal operating line and the candidate operating points of the negative torque. The ECU 50 makes the operating point of the second rotary electrical machine MG2 to move to the determined target operating point. After the process of step S8 is performed, the process of step S9 is performed.

In step S9, the ECU 50 determines whether the operating point reaches the target operating point. The ECU 50 determines whether the operating point of the second rotary electrical machine MG2 reaches the target operating point. The process of step S6 is performed when it is determined that the operating point reaches the target operating point (Y in step S9), and the process of step S8 is performed otherwise (N in step S9).

In step S10, the operating point of the rotary electrical machine with small inertia, that is, the first rotary electrical machine MG1, is made to move by the ECU 50. The ECU 50 determines the target operating point of the first rotary electrical machine MG1 on the basis of the request output of the vehicle. The MG1 optimal operating line 102 and the recommended operating area R1 when the MG1 torque is a positive torque are illustrated in FIG. 7, but the optimal operating line and the recommended operating area are similarly determined even when the MG1 torque is a negative torque. Accordingly, the ECU 50 can determine the target operating point of the first rotary electrical machine MG1 at the time of regeneration on the basis of the optimal operating line and the recommended operating area for the negative torque. The ECU 50 makes the operating point of the first rotary electrical machine MG1 move to the target operating point. After the process of step S10 is performed, the process of step S11 is performed.

In step S11, the ECU 50 determines whether the operating point reaches the target operating point. The ECU 50 determines whether the operating point of the first rotary electrical machine MG1 reaches the target operating point based on the request output of the vehicle. The process of step S6 is performed when it is determined that the operating point reaches the target operating point (Y in step S11), and the process of step S10 is performed otherwise (N in step S11).

In step S6, the ECU 50 moves the rotary electrical machines to the highest combined efficiency point with two MGs. The ECU 50 causes the first rotary electrical machine MG1 and the second rotary electrical machine MG2 to operate at the operating point at which the sum of the loss of the first rotary electrical machine MG1 and the loss of the second rotary electrical machine MG2 is minimum and the highest efficiency with two MGs is achieved.

For example, when the process flow goes form step S5 to step S6, the actual operating point can move to an operating point at which the efficiency of two MGs is the highest by a feedback control to be described below.

When the target operating point of the first rotary electrical machine MG1 reached in step S5 is an operating point departing from the recommended operating area R1, the ECU 50 makes the operating point of the second rotary electrical machine MG2 move. Specifically, out of the candidate operating points X1, X2, and X3, the operating point other than the current operating point of the second rotary electrical machine MG2 is selected again as the target operating point of the second rotary electrical machine MG2. It is preferable that the re-selection of the target operating point be performed so that the target operating point of the first rotary electrical machine MG1 determined on the basis of the re-selected target operating point of the second rotary electrical machine MG2 is within the recommended operating area R1. When the operating point of the second rotary electrical machine MG2 moves to the re-selected operating point, the target operating point of the first rotary electrical machine MG1 is re-determined. Until the combined efficiency of the first rotary electrical machine MG1 and the second rotary electrical machine MG2 is optimal, the re-selection of the target operating point of the second rotary electrical machine MG2 and the re-determination of the target operating point of the first rotary electrical machine MG1 can be repeatedly performed.

Even when the process flow goes from step S9 or step S11 to step S6, the operating points of the first rotary electrical machine MG1 and the second rotary electrical machine MG2 can be similarly made to move to the operating points at which the combined efficiency is the highest. For example, the combined efficiency of two rotary electrical machines can be calculated from the efficiency of the current operating point of the first rotary electrical machine MG1 and the efficiency of the current operating point of the second rotary electrical machine MG2. The target operating points of the first rotary electrical machine MG1 and the second rotary electrical machine MG2 can be re-determined so that this efficiency is the highest efficiency in response to the request output of the vehicle. When the process of step S6 is performed, this control flow ends.

As described above, in the drive system for a vehicle 1-1 according to this embodiment, areas that cannot be selected as the target control quantity are determined in the range of the control quantity that can be output from one rotary electrical machine. Accordingly, by step-likely changing the target control quantity of the one rotary electrical machine, the degree of change of the control quantity of the rotary electrical machine can be made to be smaller than the degree of change of the control quantity of the other rotary electrical machine. Here, the degree of change of the control quantity may be, for example, a frequency of change of the control quantity, a ratio of the time in which the control quantity is changed, the integrated value of the magnitude of the change of the control quantity, or the like. By reducing the degree of change of the control quantity of one rotary electrical machine, it is possible to enhance the efficiency of the rotary electrical machine and thus to improve electric power efficiency.

For example, by causing the rotary electrical machine with large inertia to operate step-likely, the degree of change of the control quantity of the rotary electrical machine with large inertia can be made to be smaller than the degree of change of the control quantity of the rotary electrical machine with small inertia. By suppressing the change of the control quantity of the rotary electrical machine with large inertia, it is possible to expect improvement of an effect of suppressing inertia loss due to the change of rotation.

By changing the operating point of the rotary electrical machine at which the rotary electrical machine operates step-likely when the request change of the vehicle 100 is larger than or equal to a predetermined value, it is possible to improve responsiveness, for example, initial responsiveness. That is, by causing the rotary electrical machine with small inertia when the request change of the vehicle 100 is less than the predetermined value, it is possible to improve the responsiveness to the request change.

By causing one rotary electrical machine to operate step-likely and controlling the vehicle speed finely by the use of the other rotary electrical machine, it is possible to improve control accuracy of the rotation speed. For example, compared with a case where the rotation speeds of two rotary electrical machines MG1, MG2 are continuously changed, it is possible to improve the control accuracy of the rotation speed.

The drive system for a vehicle 1-1 according to this embodiment does not cause the operating point of one of the first rotary electrical machine MG1 and the second rotary electrical machine MG2 to move while causing the operating point of the other rotary electrical machine to move. That is, the change of the control quantity of one rotary electrical machine is inhibited while changing the control quantity of the other rotary electrical machine.

Since only one rotary electrical machine moves at a time, it is possible to reduce loss. This configuration can be used as a fail countermeasure when the rotation speed sensor does not exhibit a true value or the like. For example, the rotation speed sensor of the first rotary electrical machine MG1 does not exhibit a true value and the rotation speed of the first rotary electrical machine MG1 and the rotation speed of the second rotary electrical machine MG2 are simultaneously changed, the actual rotation speed of the first rotary electrical machine MG1 cannot be known. On the contrary, when the rotation speed of only one of the two rotary electrical machines MG1, MG2 is made to move, the rotation speed of the first rotary electrical machine MG1 can be calculated from the rotation speed of another rotation element of the planetary gear mechanism 10.

The drive system for a vehicle 1-1 according to this embodiment copes with an acceleration request by causing the operating point of the rotary electrical machine with the smaller inertia to preferentially move. In other words, the drive system for a vehicle 1-1 preferentially changes the control quantity of the rotary electrical machine with the smaller inertia when the acceleration request is given. When the increase of the vehicle request output can be output by the first rotary electrical machine MG1 with the smaller inertia, the vehicle request output is realized by the control of the first rotary electrical machine MG1. After the vehicle request output is realized to transitions to normal running, the output is shared by the first rotary electrical machine MG1 and the second rotary electrical machine MG2 in consideration of efficiency or the like. That is, the vehicle request output is realized with rapid responsiveness by the use of the rotary electrical machine with the smaller inertia in a transient state in which the vehicle output is changed, and the operating points of the two rotary electrical machines MG1, MG2 are made to move to the operating points of high efficiency when the normal state is reached. Accordingly, it is possible to achieve improvement in acceleration responsiveness and reduction in inertia loss.

In this embodiment, when a deceleration request is given, which operating point of two rotary electrical machines MG1, MG2 to preferentially move is determined on the bass of the vehicle speed, but the operating point of the second rotary electrical machine MG2 with the larger inertia may be made to preferentially move in response to the deceleration request regardless of the vehicle speed.

The planetary gear mechanism 10 may be of a double pinion type. In this case, the rotary electrical machines MG1, MG2 are connected to the sun gear and the carrier, respectively, and the resultant is output from the ring gear. In the collinear diagram, the sun gear and the carrier are located on both sides and the ring gear is located therebetween.

In this embodiment, the two rotary electrical machines MG1, MG2 are connected to the single planetary gear mechanism 10, but the differential mechanism connected to the rotary electrical machines MG1, MG2 is not limited to the single planetary gear mechanism. For example, the differential mechanism may be combined planetary or Ravigneaux type planetary (for example, which includes four or five rotation elements) in which plural planetary gear mechanisms are combined.

That is, the drive system for a vehicle 1-1 is a drive system including two motors and a differential mechanism having three or more rotation elements, in which every two rotation elements among the plural rotation elements are connected to one motor and the output to the tires is coupled to the other rotation element. The drive system for a vehicle 1-1 does not include a brake element for regulating the rotations of the rotation elements of the differential mechanism and all the rotation elements can freely move. In the differential mechanism, when the rotations of two arbitrary rotation elements are determined, the rotation speed of the other rotation element is determined. The rotation elements connected to the two motors are located on the opposite sides of the output in the collinear diagram.

The rotation element other than the rotation elements coupled to the two motors and the rotation element coupled to the output to the tires, that is, a fourth rotation element, may be connected to another motor. In this case, the drive system for a vehicle 1-1 may drive the vehicle while drawing the motor coupled to the fourth rotation element. In the collinear diagram, the fourth rotation element may be located, for example, between the sun gear 11 (first rotation element) and the carrier 14 (third rotation element) or between the carrier 14 and the ring gear 13 (second rotation element).

In this embodiment, the inertia of the second rotary electrical machine MG2 is larger than the inertia of the first rotary electrical machine MG1, but the present invention is not limited to this configuration.

[First Modification Example of Embodiment]

A first modification example of the embodiment will be described below. The rotation speed difference between the MG1 rotation speed and the MG2 rotation speed may be enlarged by movement of the operating point of the first rotary electrical machine MG1 or the operating point of the second rotary electrical machine MG2. When the rotation speed difference between the MG1 rotation speed and the MG2 rotation speed is enlarged, the loss due to the differential rotation of the planetary gear mechanism 10 increases. In this modification example, the drive system for a vehicle 1-1 inhibits the rotation speed difference between the MG1 rotation speed and the MG2 rotation speed from becoming greater than or equal to a predetermined value.

Figure 8:
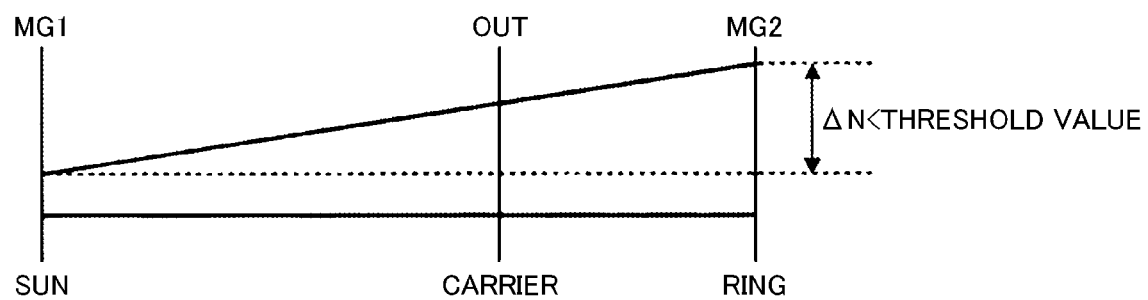
FIG. 8 is a diagram illustrating a threshold value of a rotation speed difference.

FIG. 8 is a diagram illustrating the threshold value of the rotation speed difference between the MG1 rotation speed and the MG2 rotation speed. In FIG. 8, the MG2 rotation speed is higher than the MG1 rotation speed. The rotation speed difference $\Delta N$ is the absolute value of the rotation speed difference between the MG1 rotation speed and the MG2 rotation speed. The ECU 50 inhibits the rotation speed difference $\Delta N$ from becoming greater than or equal to a predetermined threshold value. For example, when the target operating point of the first rotary electrical machine MG1 at which the vehicle request output can be realized is determined in step S3 of the above-mentioned embodiment and the rotation speed difference $\Delta N$ between the MG1 rotation speed of the target operating point and the current MG2 rotation speed is greater than or equal to the threshold value, the operation of the first rotary electrical machine MG1 at the target operating point can be inhibited. In this case, the ECU 50 determines the determination result of step S3 to be negative because the output UP request cannot be coped with by the control of the first rotary electrical machine MG1. Accordingly, it is possible to suppress an increase in loss due to the differential rotations of the planetary gear mechanism 10.

The torque difference between the MG1 torque and the MG2 torque may be enlarged due to the movement of the operating point of the first rotary electrical machine MG1 or the operating point of the second rotary electrical machine MG2. Because of the movement of the operating point of the first rotary electrical machine MG1 or the operating point of the second rotary electrical machine MG2, the difference between a current supplied to the first rotary electrical machine MG1 and a current supplied to the second rotary electrical machine MG2 may be enlarged or the difference between the energy consumption (for example, power consumption) of the first rotary electrical machine MG1 and the energy consumption of the second rotary electrical machine MG2 may be enlarged. When the difference in load factor between the rotary electrical machines MG1, MG2 is enlarged, the amount of heat emitted from the high-load rotary electrical machine increases.

The ECU 50 inhibits the difference in load factor between the rotary electrical machines MG1, MG2 from becoming greater than or equal to a threshold value. For example, when the target operating point of the first rotary electrical machine MG1 at which the vehicle request output can be realized is determined in step S3 of the above-mentioned embodiment and the difference between the load factor of the first rotary electrical machine MG1 at the target operating point and the current load factor of the second rotary electrical machine MG2 is greater than or equal to the threshold value, the operation of the first rotary electrical machine MG1 at the target operating point can be inhibited. In this case, the ECU 50 determines the determination result of step S3 to be negative because the output UP request cannot be coped with by the control of the first rotary electrical machine MG1. Accordingly, the load factors of the rotary electrical machines MG1, MG2 are averaged and the emission of heat is suppressed.

[Second Modification Example of Embodiment]

A second modification example of the above-mentioned embodiment will be described below. In the above-mentioned embodiment, the plural points of the candidate operating points X1, X2, and X3 arranged discretely can be selected as the target operating point of the second rotary electrical machine MG2. That is, the control quantity (rotation speed, torque) that can be selected as the target control quantity of the second rotary electrical machine MG2 are determined as plural points. Here, the target control quantity of the second rotary electrical machine MG2 may be selected from a predetermined range of the control quantity.

For example, the target rotation speed of the second rotary electrical machine MG2 may be selected from a predetermined range including the current MG2 rotation speed, for example, from a range of a current MG2 rotation speed±200 rpm. Alternatively, the target rotation speed of the second rotary electrical machine MG2 may be selected from a predetermined range of the MG2 rotation speed, for example, from a range of 500 rpm to 600 rpm. The same is true of the MG2 torque.

[Third Modification Example of Embodiment]

The candidate operating points X1, X2, and X3 of the second rotary electrical machine MG2 may be appropriately updated by learning or the like. The candidate operating points X1, X2, and X3 may be appropriately updated, for example, on the basis of the past change pattern of the request output, so as to reduce the inertia loss due to the movement of the operating points of the first rotary electrical machine MG1 and the second rotary electrical machine MG2.

The details described in the above-mentioned embodiment and modification examples may be appropriately combined and put into practice.

REFERENCE SIGNS LIST 1-1: vehicle drive system
10: planetary gear mechanism
11: sun gear
13: ring gear
14: carrier
20: output gear
32: driving wheel
50: ECU
100: vehicle
101: optimal operating line of MG2
102: optimal operating line of MG1
MG1: first rotary electrical machine
MG2: second rotary electrical machine
R1: recommended operating area
X1, X2, X3: candidate operating point

The invention claimed is:

1. A drive system for a vehicle, the drive system comprising:
   a first motor;
   a second motor having an inertia that is larger than an inertia of the first motor;
   a differential mechanism that includes a first rotation element, a second rotation element, and a third rotation element, the first rotation element being connected to the first motor, the second rotation element being connected to the second motor, the third rotation element being connected to driving wheels, and the first rotation element and the second rotation element being configured to be located on opposite sides with the third rotation element interposed therebetween in a collinear diagram of the differential mechanism; and
   an electronic control unit configured to:
   (a) set a range that is not able to be selected as a target operating points in a range of operating points that is able to be output by the second motor, and set the target operating point of the second motor among two or more points discrete in the range of the operating points that is able to be output by the second motor;
   (b) inhibit a change in the operating point of one motor of the first motor and the second motor while the operating point of the other motor is changed; and
   (c) when an acceleration request is given to the vehicle and when an operating point of the first motor which meets a vehicle output request is in an allowable operating area, preferentially change the operating point of the first motor, and when an acceleration request is given to the vehicle and when an operating point of the first motor which meets a vehicle output request is not in an allowable operating area, preferentially change the operating point of the second motor.

2. The drive system according to claim 1, wherein the first rotation element and the second rotation element are configured to be located on the opposite sides with the third rotation element interposed therebetween in the collinear diagram of the differential mechanism by connecting the first rotation element and the third rotation element to transmit rotation and connecting the second rotation element and the third rotation element to transmit rotation.

3. A drive system for a vehicle, the drive system comprising:
   a first rotary electrical machine;
   a second rotary electrical machine having an inertia that is larger than an inertia of the first rotary electrical machine;
   a differential mechanism that includes a first rotation element, a second rotation element, and a third rotation element, the first rotation element being connected to the first rotary electrical machine, the second rotation element being connected to the second rotary electrical machine, the third rotation element being connected to driving wheels, and the first rotation element and the second rotation element being configured to be located on opposite sides with the third rotation element interposed therebetween in a collinear diagram of the differential mechanism; and
   an electronic control unit configured to:
   (a) set a range that is not able to be selected as a target operating point in a range of operating points that is able to be output by the second rotary electrical machine, and set the target operating point of the second rotary machine among two or more points discrete in the range of the operating points that is able to be output by the second rotary machine;
   (b) inhibit a change in the operating point of one rotary electrical machine of the first rotary electrical machine and the second rotary electrical machine while the operating point of the other rotary electrical machine is changed; and
   (c) when a deceleration request is given to the vehicle, preferentially change the control quantity of the second rotary electrical machine at a high vehicle speed and, when the deceleration request is given to the vehicle, preferentially change the control quantity of the first rotary electrical machine at a low vehicle speed lower than the high vehicle speed.

4. The drive system according to claim 3, wherein the first rotation element and the second rotation element are configured to be located on the opposite sides with the third rotation element interposed therebetween in the collinear diagram of the differential mechanism by connecting the first rotation element and the third rotation element to transmit rotation and connecting the second rotation element and the third rotation element to transmit rotation.

* * * * *